June 9, 1953  M. SCHWARTZ ET AL  2,641,157
MOVING MECHANISM FOR PHOTOGRAPHIC RANGE FINDERS
Filed Oct. 5, 1951  2 Sheets-Sheet 1
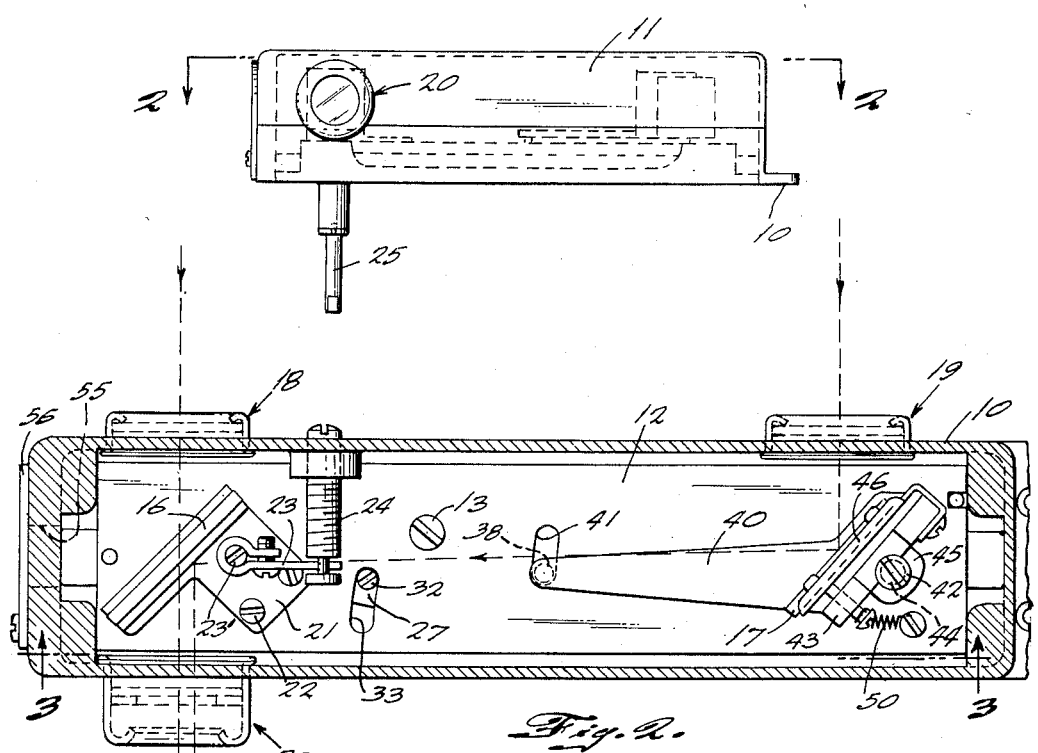
Fig. 1.
Fig. 2.
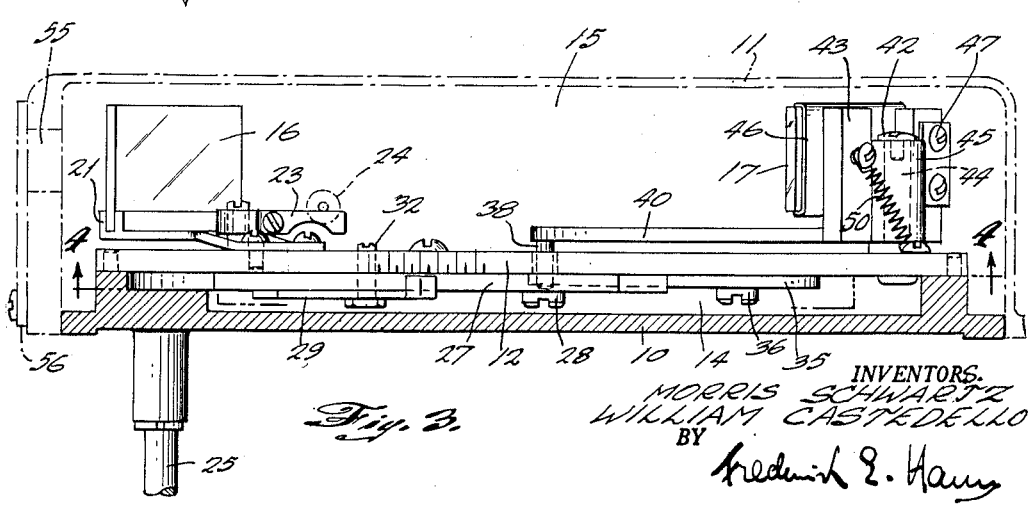
Fig. 3.
INVENTORS.
MORRIS SCHWARTZ
WILLIAM CASTEDELLO
BY
Frederick E. Harry
ATTORNEY.

June 9, 1953  M. SCHWARTZ ET AL  2,641,157

MOVING MECHANISM FOR PHOTOGRAPHIC RANGE FINDERS

Filed Oct. 5, 1951  2 Sheets-Sheet 2

INVENTORS.
MORRIS SCHWARTZ
WILLIAM CASTEDELLO
BY
Frederick E. Hane
ATTORNEY.

Patented June 9, 1953

2,641,157

UNITED STATES PATENT OFFICE 2,641,157

MOVING MECHANISM FOR PHOTOGRAPHIC RANGE FINDERS

Morris Schwartz and William Castedello, Plainville, Conn., assignors to The Kalart Company Inc., Plainville, Conn.

Application October 5, 1951, Serial No. 249,837

3 Claims. (Cl. 88—2.4)

This invention relates to range finders for photographic purposes, particularly to the moving mechanism of such finders.

While the invention is primarily intended for use in connection with so called superimposed image type finders, it can also be successfully applied to split image type finders.

Photographic range finders, whether of the superimposed image type or the split image type, generally comprise a stationary semi-transparent reflector, usually a thinly or partially silvered mirror or a prism, and a pivotal reflector, usually a solidly silvered mirror or a prism. The angular position of the pivotal mirror is controlled by the moving mechanism of the finder which in turn is controlled by the focusing movement of the lens carrier in case of a lens coupled finder or by the manipulation of adjustment and indicating means. With finders of this type, one image of an exterior object is viewable directly upon the stationary semi-transparent mirror and a second image is reflected to this mirror by the pivotal mirror. Then, by varying the angular position of the pivotal mirror, the two images viewable by an observer through an observation window are brought into a predetermined relative position, in particular into a superimposed position.

With lens coupled range finders with which this invention is primarily concerned, the focusing movement of the lens carrier of a camera relative to the camera bed is transmitted by suitable coupling means, as are well known for this purpose, to a rotatable shaft in the range finder proper so that the rotary position of this shaft is a direct function of the focusing position of the lens. The rotary position of the shaft is then transmitted to the pivotal mirror through the aforementioned moving mechanism of the finder. The entire system of transmission of movement is so adjusted that the lens is correctly focused when the two images appear to the eye of the observer in the predetermined relative position.

The design and the manufacture of the moving mechanism offers in practice considerable difficulties. On the one hand, the mechanism must be extremely accurate since the slightest variations in the ratio of transmission will result in an inaccurate range finding and, hence, focusing. On the other hand, the mechanism must be comparatively rugged since a range finder is unavoidably exposed to a certain amount of jars and impacts during normal use and handling of a camera to which it is attached. It must be possible to adjust the mechanism to the specific optical constants of the lens system with which it cooperates. As it is well known to any one familiar with the art, most lenses differ slightly from the standard constants given for the lens. Furthermore, the mechanism should retain permanently the adjusted ratio of transmission without requiring servicing and readjustment. The satisfaction of all these requirements and related requirements is made particularly difficult by the fact that the outer housing of the finder must not exceed a rather small size to remain within commercially practical dimensions, and that only a small portion of the space within the housing can be assigned to the moving mechanism. Finally, the manufacture of the finder must be comparatively inexpensive.

The principal object of the present invention is to provide a novel and improved moving mechanism for a photographic range finder of the general type, above referred to, which satisfies all the aforementioned requirements and which nevertheless is much simpler in design than hitherto known range finders in that the mechanism requires less and simpler parts than conventional mechanisms of range finders with comparable accuracy.

Other and further objects, features and advantages of the invention will be pointed out hereinafter and set forth in the appended claims forming part of the application.

In the accompanying drawing a now preferred embodiment of the invention is shown by way of illustration and not by way of limitation.

In the drawing:

Fig. 1 is a side view of a photographic range finder equipped with a moving mechanism according to the invention.

Fig. 2 is a section taken on line 2—2 of Fig. 1 on an enlarged scale.

Fig. 3 is a section taken on line 3—3 of Fig. 2.

Figure 4:
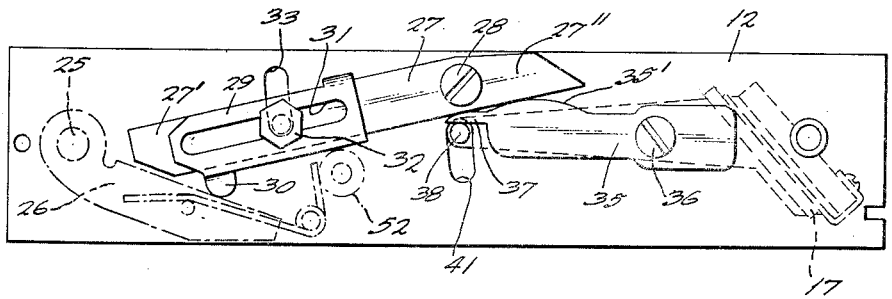
Fig. 4 is a section taken on line 4—4 of Fig. 3.
Figure 5:
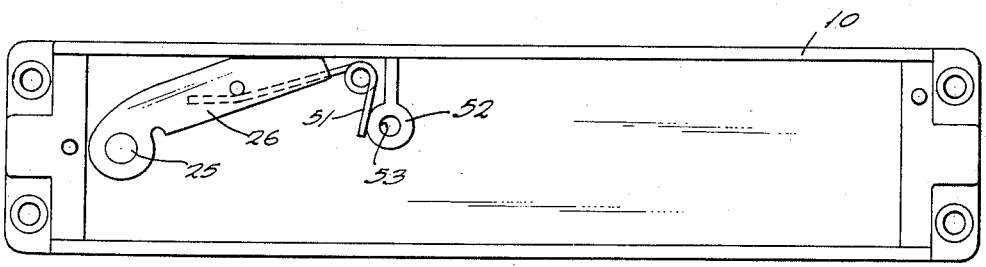
Fig. 5 is a plan view of part of the range finder mechanism.

Referring now to the figures in detail, the range finder comprises a casing or housing consisting of a bottom portion 10 and a top portion 11. The housing is attachable to the casing of a camera and is shown as having the conventional substantially rectangular shape. A base plate 12 is provided within the housing and secured to the bottom portion thereof by a screw 13 so as to form a comparatively shallow lower compartment 14 and a higher upper compartment 15. This latter compartment houses the optical system of the range finder shown as comprising a stationary, thinly or partially silvered mirror 16 and a solidly silvered pivotal mirror 17. The housing portion 11 is provided with two object windows generally designated by 18 and 19 and an observation window generally designated by 20. These windows may be of conventional design and arrangement.

The mounting for stationary mirror 16 is shown as a bracket 21 secured to the base plate by screws 22. For the purpose of an adjustment of mirror 16 as to side image a lever arm 23 is secured to a screw 23' on mounting bracket 21. The position of this arm can be adjusted by means of a screw 24 accessible from the outside of the housing. The aforementioned side image adjustment is conventional and a detailed description is not believed to be necessary for the understanding of the invention.

Referring now to the moving mechanism in detail, this mechanism is shown as comprising a rotary shaft 25 which is extended into the lower housing compartment 14. Shaft 25 may be visualized as being coupled with the lens carrier of a camera of the type in which the carrier is displaceable on the camera bed so that the angular position of shaft 25 is a function of the focusing position of the camera lens. Couplings of this type are well understood in the art and a detailed description does not appear to be essential for the understanding of the invention. The upper end of shaft 25 extending into compartment 14 supports an arm 26 fixedly secured thereto. Arm 26 coacts with a two-arm first lever 27 pivoted to base plate 12 by means of a pivot screw 28 and disposed within the lower compartment 14. As can best be seen on Fig. 4, lever 27 has a long arm 27' and a short arm 27''. The long lever arm is in engagement with shaft arm 26 by means of an adjustment sleeve 29. This adjustment sleeve is provided with a lateral protrusion or nose 30 which is in sliding engagement with shaft arm 26. For the purpose of adjusting sleeve 29 on lever arm 27', the sleeve is provided with an elongated axial slot 31 through which penetrates a screw nut 32. As can best be seen on Fig. 3, screw 32 is accessible from the top side of base plate 12 so that sleeve 29 can be secured in any desired adjusted position after removal of the upper housing portion 11. To permit a pivotal movement of lever 27, an elongated slightly curved slot 33 through base plate 12 is provided for screw 32.

The short arm 27'' of lever 27 coacts with a second lever 35 pivoted to base plate 12 by means of a pivot screw 36 and also disposed within the lower compartment 14. As can best be seen on Fig. 4, the long edge or side of lever 35 facing lever arm 27'' is provided with a curved, preferably convexly curved, protrusion 35' which is in slidable engagement with lever arm 27''. The opposite long edge or side of lever 35, or more specifically a nose 37 formed at the outer end of the lever is in slidable engagement with a pin 38 depending from a third lever 40 disposed within the upper compartment 15. Pin 38 penetrates base plate 12 by means of an elongated slightly curved slot 41 to permit a pivotal movement of lever 40. The end of lever 40 opposite to pin 38 is pivoted to base plate 12 by means of a pivot 44. Lever 40 also supports and partly forms a mounting for mirror 17. For this purpose, a bracket 43 is extended from the lever fixedly secured thereto or integral therewith. The bracket forms a bearing 45 pivotal about pivot 44. A screw 42 serves to hold the bracket in position. The mirror proper is held by means of a frame 46 screwed to the bracket 43 by screws 47.

Suitable loaded spring means such as a coil spring 50 and a spiral spring 51 serve to bias all the components of the moving mechanism so that they are always in movement transmitting engagement. Spring 51 abuts against a rib 52 protruding from the bottom of housing portion 10. This rib is also provided with a threaded bore 53 for screw 13.

The range finder has been described hereinbefore for use as a viewing range finder. To adopt the finder for use as a light beam projecting range finder, the housing is provided with a lateral opening 55 which serves to attach a light unit as is described for instance in U. S. Patent 2,397,160. This opening is covered by means of a removable cover 56 in case the finder is used as a viewing finder.

The operation of the moving mechanism, as hereinbefore described, is as follows:

Let it be assumed that shaft 25 experiences a rotary movement due to a focusing adjustment of the lens. Then, such rotary movement causes a corresponding and definite pivotal movement of mirror 17 through the agency of arm 26, first lever 27, second lever 35 and third lever 40. It will be noted that the entire mechanism requires only four basic components, namely the shaft arm and the three levers, and that the entire mechanism requires very little space within the range finder housing.

As will be apparent, from the previous description, the curved projection 35' functions as a cam surface and the point of engagement between the projection and the short lever arm 27'' constitutes in effect a fulcrum for lever 35. It will further be apparent that this point of engagement controls the ratio of transmission between shaft 25 and mirror 17 and that a change in the effective length of lever arm 27' by displacing sleeve 29 and, hence, nose 30 will vary the position of the point of engagement. This variation, in turn, changes the effective lengths of lever arm 27'' and lever 35. The curvature of the cam surface 35' allows a very accurate variation of the ratio of transmission.

As a result, the provision of the curved cam surface 35' and a lever 27 between the cam surface and the shaft arm 26 permits to adjust the range finder for the actual focal length of the lens as distinguished from the stated focal length by simply varying the ratio of transmission. As mentioned before, the actual focal range of a lens is rarely if ever the same as the stated focal range. In the manufacture of lenses, the actual focal length is generally made within a commercial tolerance of plus or minus 2 or 3% for a stated focal length. Such convenient and accurate adjustability of the range finder affords a great advantage over conventional range finders employing a cam arrangement. Conventional range finders of this type are not adjustable but must be made specifically for the exact actual focal length of the lens with which they are associated.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A moving mechanism for varying the pivotal position of the pivotal reflector of a photographic range finder of the type including a stationary semi-transparent reflector and a pivotal reflector and in which the pivotal position of the pivotal reflector is indicative of the range of an exterior object, the said moving mechanism comprising a rotatable drive shaft, an arm fixedly secured on one end to said shaft, a two-arm first lever pivotally mounted within the range finder, adjustment means for varying the effective length of one arm of said first lever, said adjustable arm being in sliding engagement with the free end of said shaft arm for pivoting the two-arm lever in response and corresponding to a rotation of said shaft, a second lever pivotally mounted withtin the range finder, said second lever being formed with a cam portion in sliding engagement with the other arm of the first lever for transmitting a pivotal movement of the first lever to the second lever, the said cam portion being convex relative to its acting surface on the said other arm of the first lever, the said acting surface being a flat surface, the effective length of the respective lever arm of the first lever controlling the ratio of transmission of the moving mechanism, a third lever operatively secured on one end to said pivotal reflector for pivotal movement in unison therewith, the other end of said third lever being in sliding engagement with the said second lever for transmitting a pivotal movement of the second lever to the third lever, and, hence, to the pivotal reflector, the pivot points of the second lever and the third lever and the points of engagement of the said levers being disposed in a spatial relationship such as to cause pivoting of the levers in the same rotational direction, and loaded spring means coacting with said levers so as to bias the same into a movement transmitting engagement.

2. A moving mechanism as defined in claim 1, wherein the said third lever and the said second lever engage each other at a point further distant from the pivot point of the second lever than the point of engagement between the first lever and the said cam portion of the second lever.

3. A moving mechanism as defined in claim 1, wherein the pivot point of the second lever is situated between the pivot point of the third lever and the point of engagement between the third lever and the second lever thereby effecting the said rotation of the second and third levers in the same direction.

MORRIS SCHWARTZ.
WILLIAM CASTEDELLO.

References Cited in the file of this patent

UNITED STATES PATENTS

| Number | Name | Date |
|---|---|---|
| 2,376,982 | Schwartz et al. | May 29, 1945 |
| 2,413,017 | Willcox | Dec. 24, 1946 |